United States Patent [19]

Cooper

[11] Patent Number: 4,665,431
[45] Date of Patent: May 12, 1987

[54] APPARATUS AND METHOD FOR RECEIVING AUDIO SIGNALS TRANSMITTED AS PART OF A TELEVISION VIDEO SIGNAL

[76] Inventor: J. Carl Cooper, 1373 Sydney Dr., Sunnyvale, Calif. 94087

[21] Appl. No.: 408,470

[22] Filed: Aug. 16, 1982

Related U.S. Application Data

[63] Continuation-in-part of Ser. No. 391,707, Jun. 24, 1982, abandoned.

[51] Int. Cl.[4] .......................... H04N 7/093; H04N 7/04
[52] U.S. Cl. ..................................... 358/145; 358/142; 358/143
[58] Field of Search ................ 358/145, 142, 143, 144, 358/197, 198, 147; 375/27

[56] References Cited

U.S. PATENT DOCUMENTS

| | | | |
|---|---|---|---|
| 4,134,127 | 1/1979 | Campioni | 358/147 |
| 4,318,125 | 3/1982 | Shutterly | 358/145 |
| 4,361,852 | 11/1982 | Katzfey | 358/145 |
| 4,361,893 | 11/1982 | Bonnerot | 375/27 |
| 4,442,461 | 4/1984 | Shirai et al. | 358/343 |

OTHER PUBLICATIONS

"LH0024 High Slew Rate Operational Amplifier" Hybrid Products Databook, National Semiconductor Corporation (1982) pp. 16-36.

Primary Examiner—James J. Groody
Assistant Examiner—Michael D. Parker
Attorney, Agent, or Firm—Woodling, Krost & Rust

[57] ABSTRACT

The apparatus and method for receiving one or more audio frequency signals transmitted on a television video signal includes a decoder comprised of a pulse separator to recover modulated pulses from said video signal and a demodulator to demodulate said modulated pulses from said separator to recover said audio signal. Also included is an encoding apparatus and method for encoding modulated pulses responsive to audio signals on a video signal.

22 Claims, 7 Drawing Figures

APPARATUS AND METHOD FOR RECEIVING AUDIO SIGNALS TRANSMITTED AS PART OF A TELEVISION VIDEO SIGNAL

This present application is a continuation-in-part of Mr. Cooper's prior "Apparatus and Method for Transmitting Audio Signals As Part of a Television Video Signal" application, Ser. No. 391,707, now abandoned, filed June 24, 1982.

BACKGROUND OF THE INVENTION

1. Field of the Invention

This invention relates to encoding and decoding audio frequency signals on a television video signal while maintaining said video signal in a standard form, thus eliminating audio to video delay problems and providing high quality audio frequency channels.

2. Description of the Prior Art

As television technology develops, several previously unforseen audio related problems are also developing. One of these problems pertains to properly maintaining the timing or synchronization relationship of audio and video signals. This problem was explained in U.S. Pat. No. 4,313,135 which may be referred to for further details. Another problem is that normal broadcast television audio is limited to one channel of 5 KHz bandwidth. With the drastic improvements in television video equipment over the past years, the image quality of television programs now far surpasses the audio quality. There is a great need for a device which can improve the audio quality of a television program, preferably to a stereo high fidelity level, and which can encode this audio in the video signal to prevent audio to video delay problems. Such an encoded audio system will have substantial cost benefits in the transmission of television programs by eliminating the need for a separate audio channel.

Several television systems exist which add digitized audio in one form or another in the blanking interval of the television video signal. This sytem has been used as a scrambling technique where it is desirable to prevent unauthorized viewing of the television program. Digitized audio requires a great deal of bandwidth, thus causing a substantial portion of the video blanking interval to be filled with digital data seriously affecting sync and burst. Unfortunately, this digital audio in blanking is not directly compatable with existing video systems and the digital audio conversion components, i.e. A-D and D-A, are fairly expensive. The digital audio in blanking does work well as a scrambled system because the digital information requires most sync information to be removed causing television receivers to malfunction.

SUMMARY OF THE INVENTION

The inventive concept herein disclosed provides an apparatus and method for encoding signals having a bandwidth lower than video signals which may or may not be program related, on a television video signal. Said apparatus and method described herein provides a pulse modulation means responsive to a signal such as a television audio signal to provide an analog modulated signal, a combination circuit to combine said modulated signal with said video signal at predetermined locations in said video signal's waveform while allowing said video signal to remain in a form which can be passed by standard video equipment with little or no modification. Also described are an associated decoder having separation means responsive to aforementioned video signal containing modulated signal to recover said modulated signal from said video signal and filter means to reconstruct the audio frequency signal which was input to the above encoder. The ability of low cost equipment to encode one or more audio frequency signals on a video signal while maintaining said video in a standard form is a very important feature of this invention. If said audio frequency signal is chosen to be program related, such as timecode or program audio, audio to video timing relationships are inherently preserved since both signals are always passed through the same delay after their combination.

DESCRIPTION OF THE PREFERRED EMBODIMENT

Figure 1:
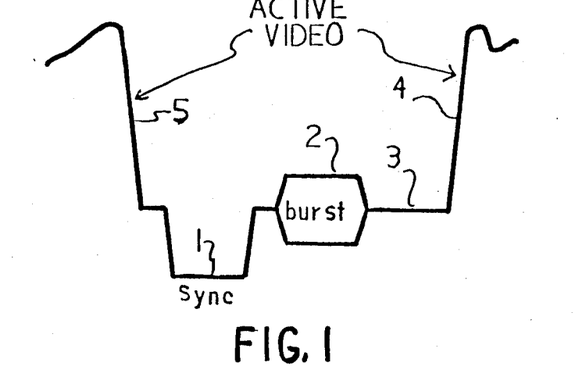
FIG. 1 is a drawing of a typical Horizontal Blanking Waveform of an NTSC or PAL video signal.

FIG. 1 is a drawing of a typical video signal horizontal waveform showing sync 1, color burst 2, back porch after burst 3, active video leading edge 4, active video trailing edge 5.

Figure 2:
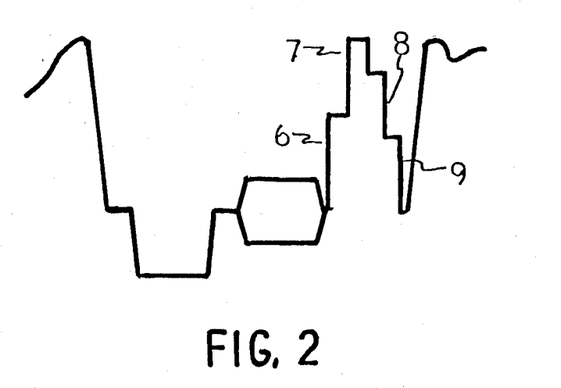
FIG. 2 is a drawing of the waveform of FIG. 1 with modulated pulses added after burst.

FIG. 2 is a drawing of the same waveform as FIG. 1 with modulated pulses 6, 7, 8 and 9 added in the back porch after burst.

Figure 3:
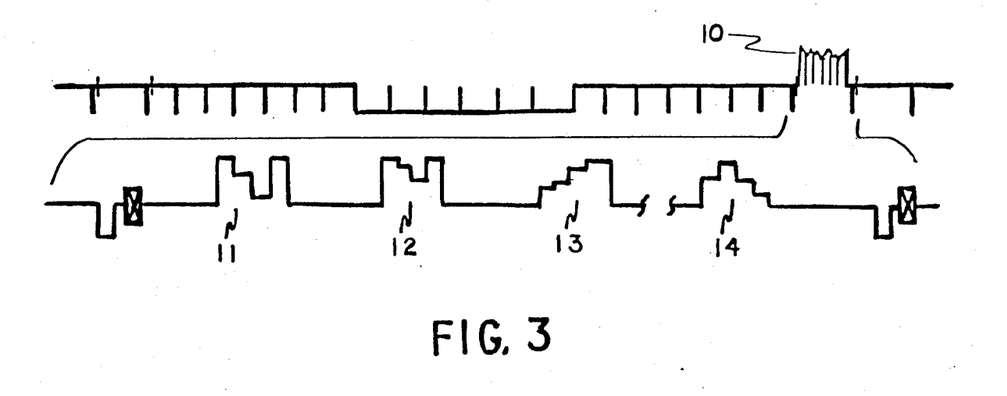
FIG. 3 is a drawing of a typical vertical interval showing audio samples for lines 1-9 combined in line 10.

FIG. 3 is a drawing of a typical video signal vertical waveform showing modulated pulses 10 on a video line with expanded drawing showing detail of 10 having pulses 11, 12, 13 and 14.

Figure 4:
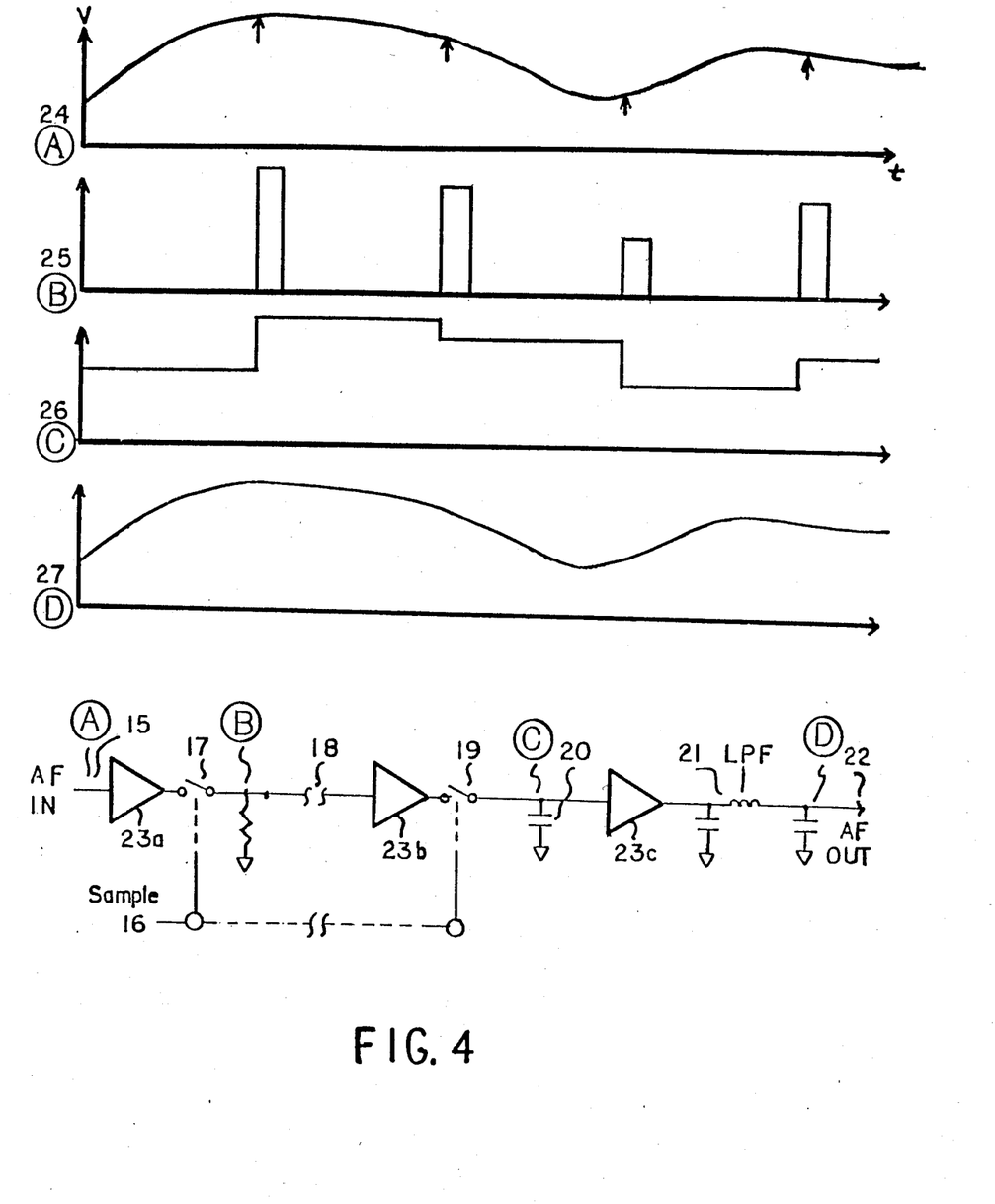
FIG. 4 is a drawing of a pulse modulation signal system with typical waveforms.

FIG. 4 is a drawing of a pulse modulation signal system showing signal input 15, sample input 16, switch 17, transmission channel 18, switch 19, hold capacitor 20, low pass filter 21, signal output 22, buffer amplifiers 23a, b and c, input waveform 24 corresponding to 15, sample waveform 25 corresponding to 18, sample and hold waveform 26 corresponding to 20 and output waveform 27 corresponding to 22.

Figure 5:
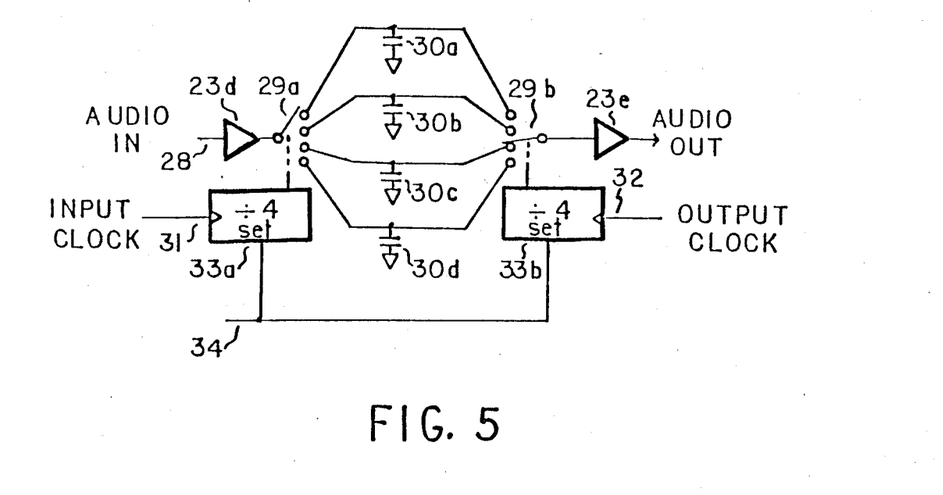
FIG. 5 is a block diagram of a 4 cell FIFO.

FIG. 5 is a drawing of a first in first out memory (FIFO) showing audio input 28, buffer amplifiers 23d and e, analog multiplexers 29a and b hold capacitors 30a–d input clock input 31 output clock input 32 counters 33a and b and set input 34.

Figure 6:
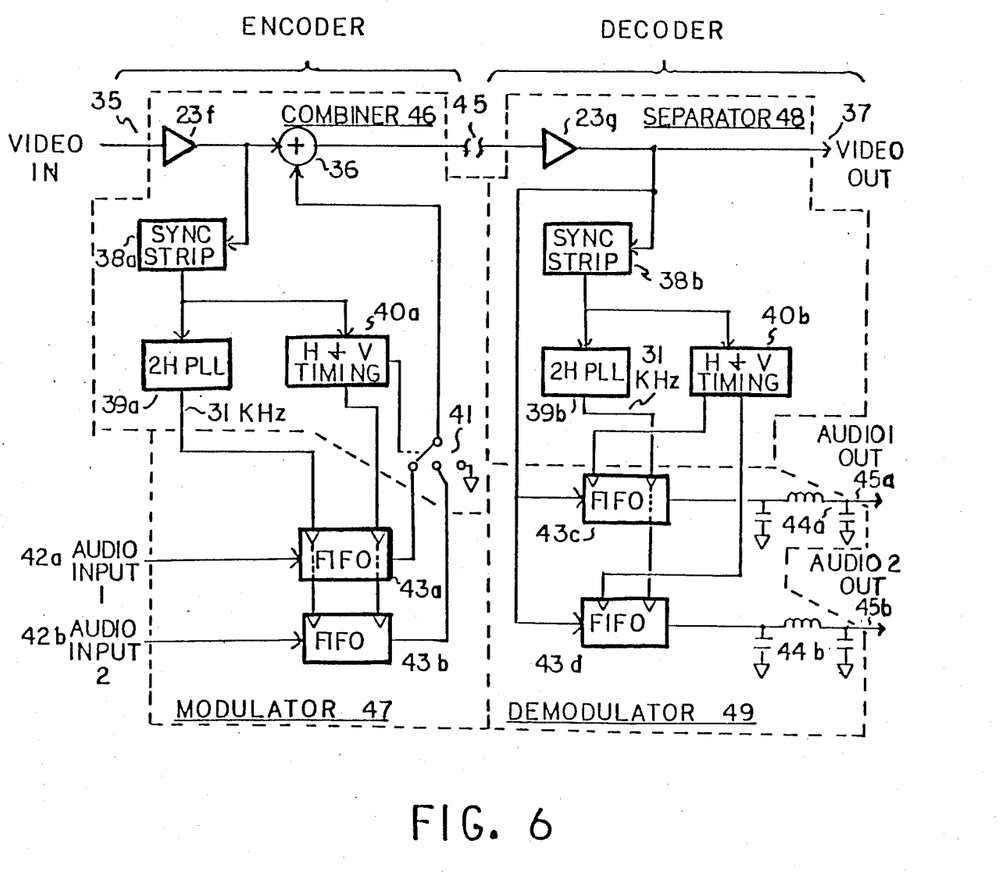
FIG. 6 is a block diagram of an audio in video transmission system showing an encoder and a decoder.

FIG. 6 is a drawing of the preferred embodiment of the invention as used in a system having an encoder made of combiner 46 and modulator 47 and having a decoder made of a separator 48 and demodulator 49. Combiner 46 is composed of buffer 23f having video input 35, adder 36, sync stripper 38a, phase lock loop 39a, timing generator 40a, and switch 41. Modulator 47 is composed of FIFOs 43a and b having audio inputs 42a and b respectively. The decoder is composed of Separator 48 and Demodulator 49. Separator 48 is composed of buffer 23g having video output 37, sync stripper 38*b*, phase locked loop 39*b*, and timing generator 40*b*. Demodulator 49 is composed of FIFOs 43*c* and *d*, low pass filters 44*a* and *b* having outputs 45*a* and *b* respectively. Encoded video and audio from aforementioned encoder pass thru transmission channel 45 to the decoder.

Figure 7:
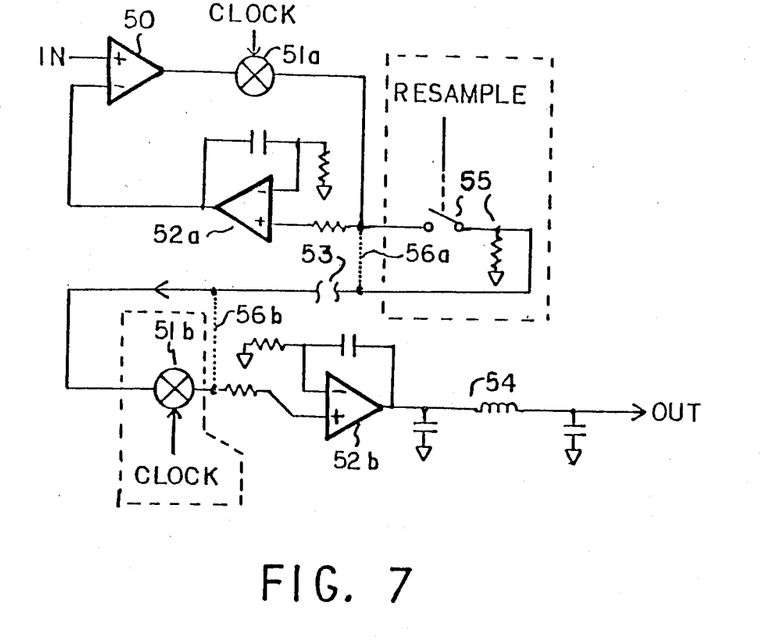
FIG. 7 is a block diagram of a differential analog pulse modulation system.

FIG. 7 is a differential pulse amplitude system having difference amplifier 50, sample and hold circuits 51*a* and *b*, integrators 52*a* and *b*, transmission channel 53, low pass filter 54, resampler 55 and showing optional connections 56*a* and *b* used when 55 and 51*b* are deleted.

In the preferred form of the invention, a relatively low bandwidth signal, which may be a time code signal, control signal, chroma signal, program audio or other low frequency signal, but which signal will be called an audio signal in this description, is sampled periodically as in a pulse amplitude modulation system and the pulses from the sampler are combined with and transmitted as part of the video signal. At the receiving end the pulses are recovered from the video by resampling by a sample and hold which drives a low pass filter to recover the audio signal. An example of such a sampled signal system without the video combination is shown in FIG. 4. Waveform 24 shows the analog signal input at AF input 15 in the block diagram. Waveform 25 shows the output of sample switch 17 which is caused to sample the buffered AF waveform by an external oscillator (not shown) which sampled waveform is transmitted via channel 18 to buffer amplifier 23*b*. The output of buffer amplifier 23*b* is resampled at an appropriate time, related to sample signal 16, by switch 19 which samples are held during open periods of 19 by hold capacitor 20 which waveform is shown by 26. The hold waveform on 20 is buffered by 23*c* and passed through low pass filter 21 to AF output 22 which is shown by 27 which output is essentially the same as the input waveform 24. The above described circuit is a variation of textbook examples of sampled signal systems. Further information of design criteria for these systems relating to signal to noise, bandwidths, spectrum and alias considerations for various pulse modulation techniques which would be suitable for use in this invention may be found in "Reference Data For Radio Engineers", Howard W. Sams & Co., Indianapolis, Ind. 46268; ©1975. Chapter 23 is particularly useful and several further references are given. Such pulse modulation systems include but are not limited to pulse amplitude modulation, pulse position modulation, pulse phase modulation, pulse duration modulation and multilevel pulse amplitude modulation. Also of interest are delta modulation and the family of differential encoding techniques which transmit binary digits in response to the change in an analog signal from one sample time to the next. These systems are not limited in dynamic range as are pulse modulation and binary pulse amplitude modulation systems. Since in high quality audio systems a dynamic range in excess of 80 db is desirable, differential encoding techniques become attractive although they are generally more difficult to implement than analog pulse amplitude modulation systems. Further information on delta modulation and differential encoding may be found in "Principles of Pulse Code Modulation" by K. W. Cattermole, American Elsevier Publishing Co., New York, NY 10017, pages 198-241. In all of the above listed pulse modulation techniques some analog parameter of a pulse such as amplitude, width, phase or position with respect to a reference; are caused to vary in response to a modulating signal. Of particular interest are pulse amplitude modulation such as described with FIG. 4 and multilevel pulse amplitude modulation because of their relative simplicity and low cost. In the former system the pulse amplitude is caused to vary in a linear fashion in response to the amplitude of the input modulating signal. This is the system which is the preferred system for the invention described herein due to its simplicity and low cost. The major disadvantage of this modulation system is that it will have a dynamic range limited by the video channel to around 60 db which is somewhat lower than desirable. If the limited dynamic range becomes a problem in a particular application it can be considerably improved by use of differential pulse modulation such as the differential pulse amplitude system, believed to be previously unknown, such as shown in FIG. 7 which will be discussed later.

The multilevel pulse amplitude system previously mentioned is similar to the pulse amplitude system shown in FIG. 4 however the pulse amplitude is allowed to assume only a limited number of discrete steps. This multilevel system allows a much better signal to noise ratio and dynamic range than the pulse amplitude system at a cost in complexity and bandwidth. For quality audio signals it is required to transmit a number of multilevel pulses for each sample of the modulating signal allowing several hundred possible levels for each sample. A typical system might transmit 4 pulses constrained to eight levels giving 4096 level precision for each audio sample resulting in poorer utilization of the transmitting channel in order to achieve a better signal to noise ratio. Further discussion of alternate modulation schemes will not be given as one skilled in the art could adapt any of several modulation schemes for use in this invention.

The inventive part of this apparatus and method involves taking the periodically generated pulses output from the sample switch (or modulator) and inserting them in a predetermined position in the video waveform. Since analog pulses or samples are inserted in the video much less space is needed than with digital systems, thus very little disturbance to the video is generated. FIG. 1 shows a typical television waveform having horizontal sync 1, color burst 2, back porch after burst 3, leading active video 4 and trailing active video 5. FIG. 2 shows the same waveform with four sample pulses 6-9 added in the back porch. This location is the preferred location for adding sample pulses in horizontal blanking since it allows the video signal to be processed by most standard video equipment with little or no modification. Other locations, such as the front porch in the video waveform may be used, however, care must be used so that the pulses do not cause disturbances to the active video, by interfering with synchronization pulses or color burst. It is worthwhile to note here that it is not practical to use only this horizontal back porch area for encoding bits in normal digital audio applications due to the large number of digital bits required. For a typical video signal bandwidth of 5 MHZ it would only be possible to insert around 8 digital bits per horizontal line in the back porch, an insufficient number of bits for most audio signals. Typical state of the art digital audio systems utilize the entire blanking interval for digital bits causing a great deal of interference with, or removal of, sync or burst. Six amplitude modulated pulses per line will however be quite adequate for two high fidelity audio signals and will fit in the 1.4 ms space available on the back porch. Inserting the amplitude modulated pulses into the predetermined location of the video waveform is not a trivial problem. With digitized audio the digital bits are simply stored in a RAM as they are developed and then read out at the appropriate time. There is, however, no analog equivalent of a digital RAM available as a manufactured device, only analog delay lines which could be used but are fairly expensive. The circuit invented to perform the necessary time compression function in a low cost fashion is an analog first in first out memory shown in FIG. 5.

The first in first out analog memory or FIFO of FIG. 5 is constructed of two buffer amplifiers 23*d* and *e*, two 4 position analog multiplexers 29*a* and *b* which are driven from four bit digital counters 33*a* and *b*, and four hold capacitors 30*a-d*. To understand the operation of the FIFO, assume a short pulse at set input 34, sets counters 33*a* to count 1 and 33*b* to count 3. Both counters count 1,2,3,4,1 etc. Audio is input to buffer 23*d* at 28 and the buffer in turn charges capacitor 30*a* (because 33*a* is on count 1) with the audio signal. Next, assume a clock pulse arrives at 31 causing counter 33*a* to count to 2 allowing buffer 23*d* to charge capicator 30*b*. Capacitor 30*a* will now be holding the charge that was placed on it by the input audio signal at the instant before counter 33*a* changed count. At each count, the audio signal will charge another capacitor in sequence in effect creating a multiplexed sample and hold. Alternately, for low clock frequencies it may be desired to cause counter circuit 33*a* to output only a short pulse rather than a count length pulse as described above. This short pulse would effect a more precise sample and hold. The short pulse could be simply effected by differentiating the counter output with an RC Network. Now assume multiplexer 29*b* is allowing each stored charge in turn to be fed into buffer amplifier 23*e* in response to output clock input to counter 33*b* at 32. The output clock does not need to be synchronous with the input clock, only the same frequency. The output to input clock relationship must be such that a new sample is not put on a capacitor until the old has been read out, and a new sample cannot be read out of a capacitor until it has been put on. One skilled in the art will see that by increasing the number of hold sections in this scheme a quite large variation of input clock to output clock phase may be handled providing that the average frequency of the two clocks is exactly the same, i.e., one sample is clocked out for every one clocked in. This will provide for temporary storage of samples, allowing samples to be generated at a steady rate, stored and read ou at an intermittant rate. This FIFO memory system is used to generate and store analog samples of an audio input and read out those samples in correct sequence when necessary to insert them in the prope location in the video waveform. This FIFO can be easily built by one skilled in the art using standard integrated circuits. The buffer amplifiers 23*d* and *e* could be a National Semiconductor LF347, the counters 33*a* and *b* a type 74LS163 the analog multiplexers 29*a* and *b* could be a National Semiconductor LF11509. If large enough volume were anticipated it would be possible to build an analog FIFO integrated circuit using MOS charge coupled device technology.

FIG. 6 shows the preferred embodiment of the invention in a system configuration. An encoder made up of a modulator 47 and combiner 46 has as its input two audio channels and an associated video signal. The signals applied at the audio channels need not be program audio but any signal such as those previously described. It should be noted that in this example the audio signals are D.C. offset to an amount corresponding to ½ of the peak positive video voltage to ensure that no negative pulses are added to the video signal. Audio inut on 42*a* and *b* is applied to FIFOs 43*a* and *b* respectively. A clocking signal at exactly twice the video horizontal rate is also input to said FIFO's input clock causing said FIFOs to periodically sample the audio signals, thus effecting pulse amplitude modulation. The clocking signal may be derived from an oscillator utilized in the timing of the input video signal or from a phase locked loop responsive to said input video. At the appropriate time during horizontal blanking, as determined by timing generator 40*a*, and corresponding to positions 6-9 of FIG. 2, the previously stored samples or modulated pulses are clock out of said FIFO's 43*a* and *b*. Said pulses clocked out are time multiplexed by switch 41 in response to timing generator 40*a* which time multiplexed pulses are added to aforementioned input video which has been buffered by 23*f* by adder 36. When pulses are not being inserted switch 41 selects ground, allowing video to pass through adder 36 unchanged. The combination of said multiplexed pulses and buffered video will appear typically as shown in FIG. 2, which combination is output from aforementioned encoder and passed through transmission channel 45 to the decoder. Phase lock loop 39*a* and timing generator 40*a* are driven from sync stripper 38*a* which recovers information from buffered video signal output from 23*f*. Phase lock loop 39*a* generates a clocking signal exactly twice the horizontal sync rate of the video signal which provides a precise frequency for the pulse modulation. Alternately a precision oscillator or external reference could be used, and frequencies other than multiples of horizontal may be used. Timing generator 40*a* ensures that exactly the same number of pulses are taken out of said FIFOs as are input. This is a relatively simple process during active video lines, however, during the vertical sync it is undesirable to insert pulses in vertical sync. The timing generator 40*a* must therefore not insert pulses during vertical which causes each FIFO 43*a* and *b* to store the 18 pulses (2 pulses per H×9 H) generated in each audio channel until after the vertical sync, where all of the stored pulses are then inserted in video as is shown in FIG. 3. It is also possible to store all samples made during the video frame, field or a longer period of time and combine those samples with video in the vertical interval thus comprising the audio signal in time. The need for adding pulses in horizontal blanking is eliminated, thus absolutely no changes are made to the horizontal blanking interval. If pulse amplitude modulation is utilized, as in this example, the compressed pulse amplitude modulated signal will be inherently bandwidth limited by most practical video equipment so that the modulated audio signal will appear to be an unmodulated but compressed audio signal. It will however in the technical sense remain a modulated signal. The main disadvantage to this system is the large FIFO requirement. A CCD analaog delay line containing internal sample and holds could replace the FIFOs, however, the CCD devices are expensive and thus somewhat undesirable. All of the parts to build the above described device are standard integrated circuits except the FIFOs which were previously described. Buffer amplifier 23*f* is a LH0002, Adder 26 is high slew rate operation amplifier LH0024, Sync Stripper 38*a* is a LM741 and TBA950-2, phase lock loop 39*a* is a LM565 and a DM8530, timing generator 40*a* is made from 74LS221's and Switch 41 is a LF11509. All part numbers are for National Semiconductor. The FIFOs could be replaced with CCD analog delays such as a Fairchild CCD321 or digital circuits with A-D and D-A converters if the higher cost were not a problem. Transmission Channel 45 may be any means capable of passing, recording or storing a video signal. The video signal containing modulated pulses having passed through 45 is input to the decoder at buffer 23g which outputs buffered video at video output 37. Buffered video also drives sync stripper 38b which in turn provides signals for phase lock loop 39b and timing generator 40b. Phase lock loop 39b and timing generator 40b perform essentially the same functions as 39a and 40a respectively, allowing pulses on video to be resampled at the appropriate time by the FIFOs thus recovering the pulses from the video and at the same time performing a sample and hold function. FIFOs 43c and 43d perform a reverse function to that provided by 43a and b where pulses in video are sampled and stored by said first mentioned FIFOs when they are present and clocked out of said FIFOs at a steady rate to drive low pass filters 44a and 44b. Filters 44a and b restore the pulses input to them to audio signals output at 45a and 45b respectively. The above described circuit thus effects demodulation of hte modulated pulses. FIFOs 43c and d should be clocked with the short sample and hold clock previously described to prevent video from being clocked into the FIFOs.

The preferred embodiment of the herein described invention utilizes two high performance audio channels to provide stereo audio having a signal bandwidth of 10 KHz. This configuration allows a modulation frequency at a multiple of Horizontal to be used which greatly simplifies clock recovery for the decoder, a valuable feature of this embodiment of the invention. The input low pass filter normally found in modulators have been omitted since it is assumed the audio equipment which feeds this invention will be properly filtered. The modulation frequency chosen could be lowered if according to Nyquist limitations the input audio bandwidth were further limited. Of particular interest is a case where the modulation frequency is chosen to be 1/10 or less of the video horizontal rate. Modulated pulses can then be generated and immediately added to video directly during horizontal blanking with no FIFO storage required. FIFO clocks may then be chosen so that they straddle the vertical sync area thus further eliminating the need for FIFO storage. In this situation the FIFO function becomes only a sample function. The phase lock loop function becomes a divider reset by vertical and performing a divide by 10, clocked at the horizontal rate. Of course, this system too with a large enough analog memory such as previously described CCD technology all of the audio swamples in a field, frame or longer period of time could be stored and then inserted in the active video portion of vertical interval lines. The storage could, of course, be accomplished with digital memories, however, this will greatly increase the cost.

FIG. 7 shows an analog pulse amplitude modulation system which has been adapted to make a differential system suitable for use with this invention. Audio is input to difference amplifier 50 where it is subtracted from the output of integrator 52a. The output of 50 is periodically sampled by sample and hold amplifier 51a providing samples for integrator 52a. Integrator 52a charges up or down in response to aforementioned samples to provide a singal essentially the same as the input audio signal during the previous clock period thus the difference amplifier 50 outputs the difference or error between the integrator and input signal over one clock cycle.

The signal output from 52a may be said to be responsive to past components of the audio signal input to 50. Assuming resampler 55 and sample and hold 51b are not used and alternate connections 56a and b are made, the samples output from sample and hold 51a are transmitted over Channel 53 to second integrator 52b, identical to 52a. Integrator 52b output is the same as the output from 52a which is essentially the same as the input audio signal, which second integrator output is passed through low pass filter 54 to the modulation system output. Low pass filter 54 removes the clock frequency stepping of the output signal. When utilized in the system of FIG. 6 the output of 51a would be input to FIFO 43a or b represented by 55 (56a and b are removed) and sample and hold 51b would be performed by FIFO 43c or d respectively. Sample and hold 51b drives integrator 52b which operates the same as previously described since the output of 51b is essentially the same as the output of 51a except delayed slightly. Channel 53 includes the rest of the functions of FIG. 6.

The above described differential pulse amplitude modulation system serves to provide the wide dynamic range of normal delta modulation systems but has a much lower clock rate than the delta system due to the fact that the transmitted sample is analog instead of digital. It does, of course, contain more circuitry than the normal pulse amplitude modulation system shown in FIG. 5 and is therefore not as desirable from a cost standpoint.

As previously mentioned being able to encode one or more high quality audio signals on a video signal without affecting the active portion of said video and preserving the sync and blanking portions of said video so that it may be passed through standard video equipment is a very important feature of this invention. The low cost of this invention, which relates to the ability to use analog techniques in place of A-D and D-A converters and locking the modulating frequency (FIFO clock) to video horizontal, is another important feature. In addition to the basic function of encoding audio on video it would also be possible to secure the audio signal by scrambling the pulses in response to some scrambling means, such as a pseudo random sequence, before or as they are added to the video. This function could be added to timing generators 40a and 40b of FIG. 6. A scrambling means which could be easily adapted to this function is described in U.S. patent application Ser. No. 306,491 now abandoned. The audio scrambler would be especially secure if multilevel pulse amplitude modulation were used and the pulse levels were scrambled. The video signal could, of course, also be scrambled. This would give a completely secured television signal having normal sync and blanking and requiring only a standard video channel for transmission.

Although this invention has been described in its preferred form with a certain degree of particularity, it is understood that the present disclosure of the preferred form has been made only by way of example and that numerous changes in the details of construction and the combination and arrangement of parts may be resorted to as well as the combination of functions within or as part of other devices, without departing from the spirit and the scope of the invention as hereinafter claimed.

What is claimed is:

1. Apparatus for recovering a secondary signal which has been previously encoded on a video signal which encoding utilizes a modulated signal responsive to said secondary signal which modulated signal was combined with said video signal without increasing the bandwith required by said video signal or causing substantial amount of synchronizing information to be deleted from said video signal, including in combination separator means responsive to said video signal to determine the points on said video signal from which said modulated signal may be recovered in response to a clocking signal phase locked to said video and demodulator means responsive to said separator means and said modulated signal to recover said secondary signal.

2. Apparatus for decoding a secondary signal which has been combined with and transmitted as part of a television video signal including in combination separator means responsive to blanking areas of said video signal which areas include the video portion of the vertical blanking interval of said video signal and further responsive to a sampling signal phase locked to the synchronizing portion of said video signal to determine the points on said video signal from which said combined secondary signal may be recovered and demodulator means responsive to said separator means and said video signal to recover and output an output signal essentially the same as said secondary signal.

3. Apparatus as claimed in claim 1 or 2 wherein said separator means is responsive to said video signal to provide a clocking signal utilized by said demodulator means which demodulator means contains an analog memory responsive to said clocking signal to output analog samples at a predetermined rate.

4. Apparatus as claimed in claim 1 or 2 wherein said modulated signal is a difference signal derived from present and past portions of said secondary signal.

5. Apparatus as claimed in claim 1 or 2 wherein said modulated signal is a multiple level signal which is constrained in amplitude to three or more distinct levels.

6. Apparatus for recovering from a first video signal a secondary signal which was previously used to generate an analog modulated signal which modulated signal was combined with said video signal including in combination separator means to generate a third signal phase locked to the sync pulses of said video signal to determine the location of said modulated signal, storage means responsive to said third signal phase locked to sync pulses of said separator means and said video signal to recover and store said modulated signal from said determined locations in said video signal which storage means outputs said modulated signal at a constant rate and further including low pass filter means operable in response to said storage means to output analog information which is essentially the same as said secondary signal.

7. Apparatus as claimed in claim 6 wherein said storage means samples said modulated signal at predetermined locations in the blanking area of said video signal which samples are stored in said storage means with said low pass filter means responsive to said samples to output said output analog information.

8. Apparatus as claimed in claims 1, 2, 6 or 7 wherein said secondary signal is a television program audio signal said video signal has the same number of synchronizing pulses before and after said combination and said modulated signal is a pulse amplitude modulated signal previously generated in response to said secondary signal which pulse amplitude modulated signal in input to said demodulator means which demodulator means processes said modulated signal effecting recovery of said secondary signal which processing includes removing modulating frequency components from said modulated signal.

9. Apparatus for decoding a sampled audio frequency signal which is carried in pulse modulated form on a television video signal in the blanking interval thereof which video signal contains synchronizing pulses unaffected in quantity by such carriage including in combination separator means responsive to said video signal to provide clocking pulses locating the position of the sampled audio frequency signal and demodulation means response to said clocking pulses and the television video signal to sample said modulated sampled audio frequency signal at predetermined locations in the blanking interval to recover said pulse modulated signal from the television video signal, which apparatus includes filter means to perform sample frequency filtering of said recovered pulse modulated signal.

10. The method of decoding an audio frequency signal which was previously encoded in the blanking interval of a television video signal which video signal is passed through or stored on standard video equipment, including a step of sampling said encoded audio frequency signal on said video signal at predetermined locations in the blanking interval thereof said locations determined in response to sync pulses of said video signal, a step of temporarily storing said samples in a memory, a step of outputting said samples from said memory at a steady rate and a further step of removing encoding related components from said output samples thus recovering said audio frequency signal.

11. The method of recovering a secondary signal which was previously used to generate a modulated signal which modulated signal is carried on a television video signal without reducing the number of synchronizing pulses of said video signal including a step of generating a first clocking signal responsive to synchronizing information of said video signal and generating a second stable clocking signal, a step of sampling said modulated signal in response to said first clocking signal, a step of storing said samples in a memory, a step of removing said samples from said memory in response to said second clocking signal and a further step of filtering said removed samples to recover said secondary signal.

12. The method as claimed in claim 11 wherein said modulated signal is a difference signal derived from past and present portions secondary signal.

13. The method of restoring a continuous secondary signal which has been compressed in time and combined in analog form with a video signal without substantially reducing the number of synchronizing pulses of said video signal including a step of sampling said video signal to produce an intermittent secondary signal, a step of storing said intermittent secondary signal produced by said sampling, a step of continuously retrieving said stored intermittent secondary signal and a step of converting retrieved signals to a continuous analog signal essentially the same as said continuous secondary signal.

14. The method as claimed in claim 13 wherein said intermittent secondary signal is stored in analog form.

15. The method as claimed in claim 13 wherein said intermittent secondary signal is digitized as part of said sampling step, stored in digitized form in said storage step and converted from digital back to analog as part of said converting step.

16. The method as claimed in claim 13 wherein said continuous secondary signal is a multiple level signal having three or more distinct levels.

17. An apparatus for receiving low bandwidth signals transmitted as part of a television signal having a timing pulse and a section without substantive picture related information, the transmission including converting the low bandwidth signals into an intermittent sped up modulated signal related to the timing pulse and including the modulated signal into the section of the television signal without substantive picture related information to be transmitted therewith, said receiving apparatus comprising meas to separate the sped up intermittent modulated signal from the section of the television signal without substantive picture related information, said separation means utilizing the timing pulse of the television signal, and means to reconvert theseparated sped up intermittent modulated signal back into a signal substantially equivalent to the low bandwidth signal.

18. The apparatus of claim 17 characterized in that the intermittent modulated signal has a frequency related to the television signal.

19. The apparatus of claim 17 wherein the television signal has a horizontal sync rate and characterized in that the intermittent modulated signal utilizes the horizontal sync rate of the television signal as the timing pulse.

20. An apparatus for receiving a low bandwidth signal transmitted as part of a television signal having a timing pulse and a section without substantive picture related information, the television signal including the low bandwidth signal having sampled at one clock rate, and converted into an analog intermittent signal at a different second clock rate, the intermittent signal having substantially the same information as the low bandwidth signal, the second clock rate being related to the timing pulse of the television signal, and combining the intermittent signal into the section of the television signal without substantive picture related information for transmission with the television signal, said receiving apparatus comprising means to receive the television signal including the intermittent signal, uncombining means to separate the intermittent signal from the television signal, said uncombining means having a clock rate substantially equal to the second clock rate, and means to reconvert the intermittent signal back into a signal substantially equivalent to the low bandwidth signal.

21. The apparatus of claim 20 characterized in that said clock rate of said uncombining measn utilizes to the timing pulse of the television signal.

22. The apparatus of claims 20 or 21 wherein the television signal has a horizontal sync timing and characterized in that the second clock rate is responsive to the horizontal sync timing of the television signal.

* * * * *

UNITED STATES PATENT AND TRADEMARK OFFICE
CERTIFICATE OF CORRECTION

PATENT NO. : 4,665,431
DATED : May 12, 1987
INVENTOR(S) : J. Carl Cooper

It is certified that error appears in the above-indentified patent and that said Letters Patent is hereby corrected as shown below:

Column 6, line 48, after "thus", delete "comprising" and insert --compressing--.

Column 6, line 65, after "Adder", delete "26" and insert --36--.

Column 7, line 26, after "of", delete "hte" and insert --the--.

Column 7, line 55, after "audio", delete "swamples" and insert --samples--.

Column 11, line 19, after "comprising", delete "meas" and insert --means--.

Column 11, line 23, after "reconvert", delete "theseparated" and insert -- the separated --.

Column 12, line 25, after "uncombining", delete "measn utilizes to", and insert --means utilizes--.

Signed and Sealed this

Twenty-first Day of March, 1995

Attest:

BRUCE LEHMAN

*Attesting Officer*    *Commissioner of Patents and Trademarks*